United States Patent

[11] 3,599,122

[72] Inventor Peter Leuthold
Erlenbach, Switzerland
[21] Appl. No. 863,999
[22] Filed Oct. 6, 1969
[45] Patented Aug. 10, 1971
[73] Assignee U.S. Philips Corporation
New York, N.Y.
[32] Priority Oct. 10, 1968
[33] Switzerland
[31] 15170/68

[54] FILTER NETWORK INCLUDING AT LEAST ONE TAPPED ELECTROMAGNETIC DELAY LINE
10 Claims, 9 Drawing Figs.

[52] U.S. Cl. .......... 333/29, 333/70 CR, 333/31 C
[51] Int. Cl. .......... H03h 7/34
[50] Field of Search .......... 333/29, 70, 77, 31, 31 C, 70 CR

[56] References Cited
UNITED STATES PATENTS

| | | | |
|---|---|---|---|
| 3,283,269 | 11/1966 | Bernstein .......... | 333/29 |
| 3,418,606 | 12/1968 | Adams .......... | 333/29 X |
| 3,439,293 | 4/1969 | Senf .......... | 333/29 |
| 3,492,606 | 1/1970 | Chen .......... | 333/29 X |

*Primary Examiner*—Herman Karl Saalbach
*Assistant Examiner*—Marvin Nussbaum
*Attorney*—Frank R. Trifari

ABSTRACT: A delay line for use in a filter has a strip or coil conductor continuously coupled to the conductor. The conductor has a longitudinally varying impedance such as resistance, capacitance, or inductance. This is achieved by varying the thickness, width, or pitch of the conductor, so that many transfer functions can be synthesized.

INVENTOR.
PETER LEUTHOLD
BY
[signature]
AGENT

INVENTOR.
PETER LEUTHOLD
BY
F. R. Trifari
AGENT

INVENTOR.
PETER LEUTHOLD
BY
K. A. Trafon
AGENT

FILTER NETWORK INCLUDING AT LEAST ONE TAPPED ELECTROMAGNETIC DELAY LINE

The invention relates to a filter network having at least one tapped electromagnetic delay line for filtering time function electric signals in the frequency range, the output signals of the filter network being produced by summation of the subsignals which have been derived from the input signals through the tapped delay line and have been converted. Filter networks generally are built from passive elements, such as coils, capacitors and resistors.

For many uses not only the amplitude characteristic of a filter as a function of the frequency, but also its phase characteristic is decisive. In modern telecommunication technology (television, pulse modulation) low-pass filters, band-pass filters and phase shifters with linear phase characteristics and/or constant group transmission times are of particular importance.

The construction of such filter networks by conventional techniques is expensive and complicated and permits of obtaining only a comparatively rough approximation of the linear phase characteristic.

Transmission line filters are known. They substantially comprise a delay line which at certain points is tapped by means of resistors. A suitable choice of the values of the resistors permits of simply obtaining relationships between the signal voltage at the input of the delay line and the sum of the currents taken through the tappings, which relationships are fair approximations of the relationships between the input and output signals of a four-terminal network having a predetermined transfer function. Particularly filters having strictly linear phase characteristics are readily obtainable by this method.

Such transmission line filters, however, also have undesirable properties. In general, a particularly inconvenient property is the periodic continuation of the transfer characteristic as a function of the frequency. For suppressing higher passbands, conventional filters are required, which in turn give rise to distortion of the amplitude and phase characteristics.

It is an object of the invention to provide a filter network which does not have these disadvantages.

The filter network according to the invention is characterized in that the delay line is provided over at least a continuous part of its length with a continuous electric tapping, and that the tapping means for the multiplication of the subsignals derived in each infinitely small segment of the length ($\Delta x$) of the tapping is formed with a real factor.

Figure 1:
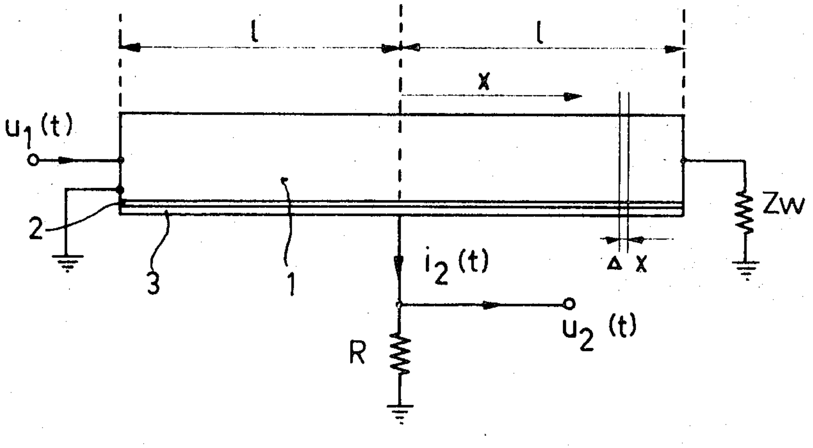
Figure 2:
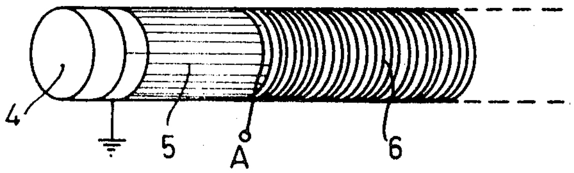
Fig. 2 PRIOR ART
Figure 3:
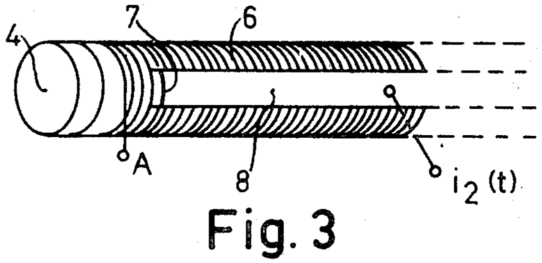
Figure 4:
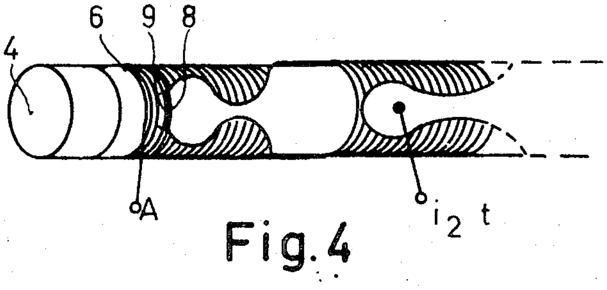
Figure 5:
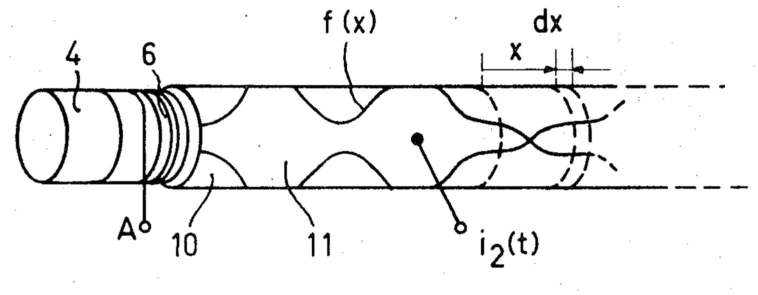
Figure 6:
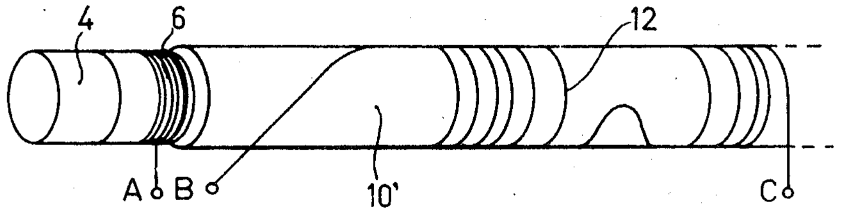
Figure 7:
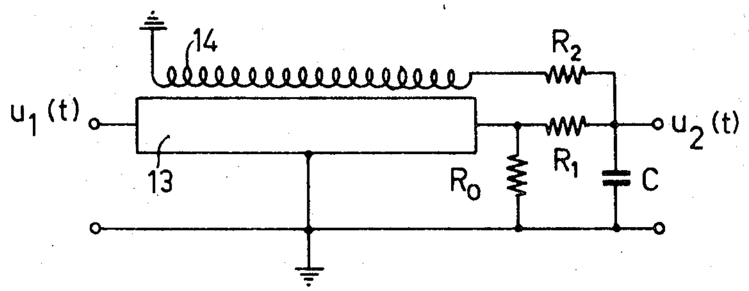
Figure 8:
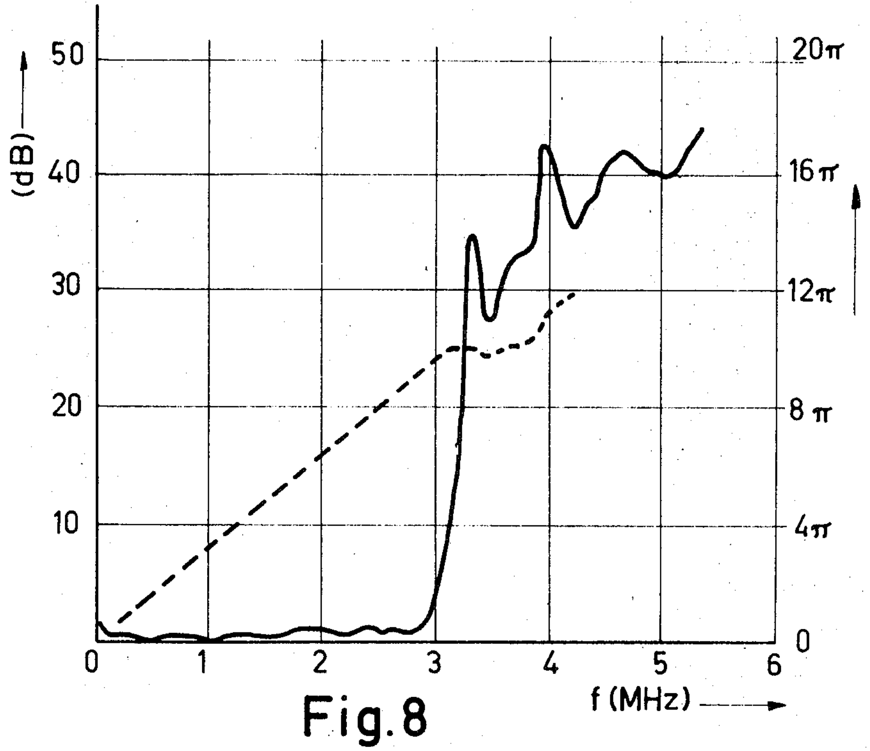
Figure 9:
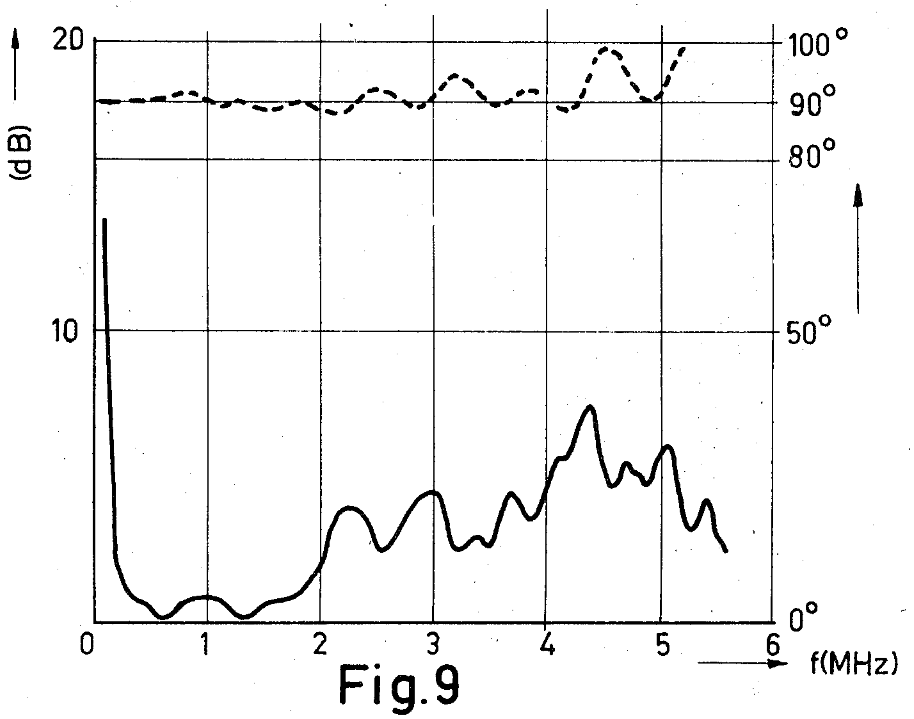

The invention will now be described more fully with reference to embodiments shown, by way of example, in the accompanying drawings, in which:

FIG. 1 shows schematically a simple embodiment of the filter network according to the invention for driving the transmission properties of such filters, FIG 2 shows the construction of a delay line, FIG. 3 shows an embodiment of a filter network according to the invention in which the delay line is tapped by means of a resistance layer, FIG. 4 shows another embodiment of a filter network according to the invention provided with a resistive tapping, FIG. 5 is an embodiment of a filter network according to the invention provided with a capacitive tapping, FIG. 6 shows an embodiment of a filter network according to the invention provided with an inductive tapping, FIG. 7 shows schematically the construction of a low-pass filter, FIG. 8 is a diagram of the transfer characteristic of the low-pass filter shown in Figure 7, and FIG. 9 is a diagram of the amplitude characteristic and the phase shift of a wide-band 90° phase shifting circuit according to the invention.

The transmission properties of filter networks according to the invention will be discussed with reference to an ideal delay line 1 of length $2l$ shown schematically in FIG. 1, which line is terminated without reflection by its characteristic impedance $Z_w$. To the delay line 1 is applied strip-shaped thin resistance layer 2 which extends along the entire length of $2l$ and throughout its length is in electric contact with a conductor which serves as a current collector. The thin resistance layer 2 has a conductivity in a direction at right angles to the $x$ direction which is dependent on the local variable $x$. An input voltage $u_1(t)$ is applied to the delay line 1. The thin resistance layer 2 delivers a given subcurrent in each infinitely small interval $\Delta x$. All these subcurrents are collected in the collector and flow as an overall current $i_2(t)$ through a resistor R which is connected to the collector 3 and from which the output voltage $u_2(t)$ can be taken.

The relationship between the voltages $u_1(t)$ and $u_2(t)$ is given by the transfer function H $(\omega)$ which will be computed hereinafter.

The voltage in an ideal delay line as a function of place and time can be written as follows:

$$u_1(t)\ (x,t)=u_1(t-l/v-x/v)$$

where $l$ is one half of the length of the delay line, $x$ is the local variable and $v$ is the velocity of propagation of the signal.

If $g(x)$ is the conductivity per unit length of the thin resistance layer, the overall current $i_2(t)$ can be calculated by means of the formula $$i_2(t)=\int_{-1}^{1}u_1(t-l/v-x/v)g(x)dx \qquad (2)$$

For $$R\ll 1\Big/\int_{-1}^{1}g(x)dx$$

the output voltage will be $$u_2(t)=R\int_{-1}^{1}u_1(t-l/v-x/v)g(x)dx \qquad (3)$$

The transfer function H $(\omega)$ of a system is given by the quotient of the Fourier transformed $U_2(\omega)$ of the output voltage $u_2(t)$ and of the Fourier transformed $U_1(\omega)$ of the input voltage $u_1(t)$:

$$H(\omega)=U_2(\omega)/U_1(\omega) \qquad (4)$$

$$U_1(\omega)=\int_{\infty}^{\infty}u_1(t)e^{-j\omega t}dt \qquad (5)$$

$$U_2(\omega)=\int_{\infty}^{\infty}u_2(t)e^{-j\omega t}dt \qquad (6)$$

Substitution of equation (3) in (6) gives:

$$U_2(\omega)R=\int_{\infty}^{\infty}\int_{-1}^{1}u_1\left(t-\frac{l}{v}-\frac{x}{v}\right)g(x)e^{-j\omega t}dx\,dt$$

For physical reasons, it is allowed to interchange the two integrations:

$$U_2(\mu)=R\int_{-1}^{1}g(x)dx\int_{-\infty}^{\infty}u_1\left(t\ \frac{l}{v}-\frac{x}{v}\right)e^{-j\omega t}dt \qquad (7)$$

With due regard to the fact that a delay of the time function by an amount of T means only a multiplication by the factor $e^{1j\omega t}$ in the spectral range, the equation (7) can be given the following form:

$$U_2(\omega)=U_1(\omega)e^{-j\frac{l}{v}\omega}\cdot R\int_{1}^{1}g(x)e^{-j\frac{x}{v}\omega}dx \qquad (8)$$

Thus, the transfer function is:

$$H(\omega)=e^{-j\frac{l}{v}}\cdot R\int_{-1}^{1}g(x)e^{-j\frac{x}{v}\omega}dx \qquad (9)$$

$$e^{-j\frac{l}{v}\omega}$$

The first term $e$ means only a delay of the signal $u_1(t)$ by a time $T=e/v$. The frequency characteristic proper is given by the relationship $$H_0(\omega)=R\int_{-1}^{1}g(x)e^{-j\frac{x}{v}\omega}dx \qquad (10)$$

The Equation 10 can also be written:

$$H_0(\omega)=R\int_{-\infty}^{\infty}g(x)e^{-j\frac{x}{v}\omega}dx-R\int_{-\infty}^{-l}g(x)e^{-j\frac{x}{v}\omega}dx+R\int_{l}^{\infty}g(x)e^{-j\frac{x}{v}\omega}dx \quad (11)$$

If $l$ is sufficiently large, the negative terms of the equation (11) will be negligibly small, and we have with sufficient accuracy:

$$H_0(\omega)\approx R\int_{-\infty}^{\infty}g(x)e^{-j\frac{x}{v}\omega}dx \quad (12)$$

or $$H_0(\omega)\approx RG\left(\frac{\omega}{v}\right) \quad (13)$$

Retransformation of the equation (13) leads to the response characteristic $h_o(t)$:

$$h_0(t)=\frac{l}{2\pi}\int_{-\infty}^{\infty}H_0(\omega)e^{j\omega t}d\omega\approx\frac{l}{2\pi}R\int_{-\infty}^{\infty}G\left(\frac{\omega}{v}\right)e^{j\omega t}d\omega \quad (14)$$

With $$t=\frac{x}{v}$$

we get:

$$g(x)\approx\frac{h_0\left(\frac{x}{v}\right)}{Rv} \quad (15)$$

Suitable values of the components of a filter as shown in FIG. 1 follow from equation (15). From the given generally complex transfer function $H_o(\omega)$ the associated response characteristic $h_o(t)$ can be calculated. From this the desired conductivity per unit length $g(x)$ of the thin layer follows directly.

The deviation $\Delta(\omega)$ of the obtained transfer function $H_o(\omega)$ from the given transfer function $H_o(\omega)$ which is due to the finite length $2l$ of the delay line, is $$\Delta(\omega)=\tilde{H}_0(\omega)-H_0(\omega)=\int_{-\infty}^{-l/v}h_0(t)e^{-j\omega t}dt+\int_{l/v}^{\infty}h_0(t)e^{-j\omega t}dt \quad (16)$$

$\Delta(\omega)$ obviously depends upon the frequency dependence of the given transfer function $H_o(\omega)$; hence no universally valid accurate data can be given. If it is assumed, however, that $H_o(\omega)$ vanishes outside the arbitrarily chosen interval $-\omega_o\leq\omega\leq\omega_o$, the following can be said about the minimum required half length $l$ of the delay line at which $$|\Delta(\omega)/H_0(\omega)|\ll 1 : l>\frac{v}{2f_0},\ \omega_0=2\pi f_0 \quad (17)$$

An interesting possibility occurs when the function $g(x)$ is even or odd. In this case, a delay line is used which is not terminated or short circuited at its end. In the first case, there will be total reflection of the signal, in the second case there will additionally be a shift through 180°. The zero point of the local variable $x$ is shifted to the end of the line. The conductivity per unit length $g(x)$ of the resistance layer 2 only has to be plotted for $x$ O,i.e.from the beginning of the line towards the input. This gives the same effect as a delay line of twice the length.

A construction of a delay line suitable for such filters is shown in FIG. 2. Strips of copper foil 5 have been attached by means of an adhesive to a cylindrical rod 4 (made, for example, of Perspex, as the case may be with ferrite). Copper wire 6, which may be stranded is wound on the copper foil 5. Details of such delay lines are given, for example, in J.F. Blackburn, *Components Handbook*, McGraw-Hill, New York 1949. The inductance of the winding and the capacitance between the winding and the partly earthed copper strips cause a delay of the signal voltage applied between the terminal A of the winding and earth. When the inductance per unit length and the capacitance per unit length of the delay line are designated by L' and C' respectively, the velocity of propagation $v$ in the delay line follows from the known telegraphy equation:

$$v=l/\sqrt{L'C'} \quad (18)$$

In principle, the continuous tapping according to the invention can have three forms, namely: resistive, capacitive or inductive The resistive tapping corresponds to the theory expounded so far. An embodiment of a filter provided with continuous resistive tapping is shown in FIG. 3. From a strip of the winding 6 of the delay line, which strip extends parallel to the rod axis, the insulating material has been removed and subsequently a resistance layer 7 having a conductivity per unit length (conductance function) $g(i\ x)$ has been applied. The resistance layer 7 has been coated with a metallic collector layer 8 by deposition from the vapor phase. However, simulating the required function $g(x)$ in the resistance layer 7 is difficult if the width of this resistance layer is uniform. A simpler possibility shown in FIG. 4 is to use a uniformly thick resistance layer 9 and to vary the coated surface area.

Since by means of a resistance layer no negative conductances can be simulated, two separate rods 4 must be used to which the signal to be filtered is applied with a phase difference of 180°. One of the rods carries resistance layers which correspond to the positive terms of the function $g(x)$ and the other carries resistance layers which correspond to the negative terms of this function. The collector currents of the two rods then must be added.

The metallic collector layer obviously acts as a capacitive tapping also the capacitive effect being stronger in proportion as the resistance layer is thinner. The use of a thick resistance layer results in an appreciable conductivity in a direction parallel to the rod axis; this greatly reduces the possibility of approximating to arbitrary frequency characteristics. For this reason, the capacitive or inductive continuous tapping is to be preferred.

The practical constructions of a filter having a capacitive continuous tapping is shown in FIG. 5. Over the winding 6 of the delay line there is slipped a dielectric 10 to which is applied a metallic layer 11. If the outline curve of the metallic layer 11 is designated by $f(x)$ and the thickness of the dielectric 10 by $d$, then the approximate relation for the capacitance $C(x)$ is $$dC(x)=\epsilon\frac{2f(x)dx}{d} \quad (19)$$

where $\epsilon$ = the dielectric constant.

The current contribution $dI_2$ provided by the differential capacitance $dC(x)$ is:

$$di_2=dC(x)\frac{\delta u1(x,t)}{\delta t} \quad (20)$$

From this we get by integration the overall current $i_2(t)$:

$$i_2(t)=\frac{2\epsilon}{d}\int_{-l}^{l}\frac{\delta u l}{\delta t}f(x)dx \quad (21)$$

from a constant factor, the difference between the equations (2) and (21) consists in that in the latter case the derivative $\delta u_1/\delta t$ of the input voltage stands under the integral. Hence, the filter wit a capacitive tapping together with a preceding or succeeding integrator acts exactly as a filter provided with a resistive tapping. With respect to the values of the components, we have according to equation (15):

$$f(x)\approx\frac{l}{k}\frac{d}{2\epsilon}\frac{h_0\left(\frac{x}{v}\right)}{R\cdot v} \quad (22)$$

the quantity $k$ represents the integration constant.

Since the outline function $f(x)$ of the coating 11 can only be positive. in the capacitive tapping also two rods are generally required to form arbitrary transmission characteristics.

The practical construction of a filter having an inductive continuous tapping is shown in FIG. 6. A secondary winding 12, which comprises a variable number of turns per unit length is wound on a dielectric 10′ which has been slid over the winding 6 of the delay line. In each section of the secondary winding 12 a given subvoltage induced. The sum $u_2(t)$ of all the subvoltages appears immediately between terminals B and C; thus, no conversion of a current $i_2(t)$ into the voltage $u_2(t)$ is required. A further advantage of the inductive tapping consists in that positive and negative subvoltages can be produced by a change in the winding sense, so that all possible frequency characteristics are obtainable with a single rod.

A computation of the inductively tapped filter starts from the proportionality between the voltage $u_1(x, t)$ or the current $i_1(x, t)$ and the magnetic flux $\Phi(x, t)$ of the delay line;

$$\phi(x,t)=ci_1(x,t)=\frac{c}{Z_w}u_1(x,t) \qquad (23)$$

In this expression $c$ is a proportionality factor and $Z_w$ is the characteristic impedance of the delay line.

If the number of turns per unit length of the secondary winding is designated by $n(x)$, for the subflux $d\Psi$ we have the relation $$d\Psi=(x,t)\,n(x)\,dx \qquad (24)$$

According to the law of induction, the subvoltage $du_2$ then is $$du_2=\frac{\delta}{\delta t}[\phi(x,t)n(x)dx] \qquad (25)$$

The output voltage $u_2(t)$ is obtained by integration of the equation (25):

$$u_2(t)=\int_{-1}^{1}\frac{\delta\phi}{\delta t}n(x)dx=\frac{c}{Z_w}\int_{-1}^{1}\frac{\delta u1}{dt}N(x)dx \qquad (26)$$

When the equation (21) is multiplied by the resistance R and the result is then compared with the equation (26) the prescribed proportions will be found in accordance with the equation (22):

$$n(x)\approx\frac{1}{k}\frac{Z_w}{c}\frac{h_0\left(\frac{x}{v}\right)}{v} \qquad (27)$$

The quantity $k$ again represents the integration constant of an integrator, which is required in the case of inductive taping also.

Especially, it should be stated that the integration can directly be performed in the filter. The transfer function $H_i(\omega)$ of the integrator member can directly be combined with the desired transmission characteristic $H_o(\omega)$ to give:

$$H_t(\omega)=H_o(\omega)\cdot H_i(\omega) \qquad (28)$$

The associated response characteristic $h_T(t)$ then is calculated; the functions $f(x)$ and $n(x)$ follow from the equations (22) and (27).

A particularly interesting embodiment of these filters is obtainable if the response characteristic $h_o(t)$ to be obtained is periodic. This is the case, for example, in a band-pass filter. An infinitely narrow band-pass filter with the center angular frequency $\omega_1$ has the response characteristic $$h_o(t)=a\cos\omega l\,t \qquad (29)$$

where $a$ is a constant dependent upon the proportions. Obviously, in a filter provided with an inductive tapping the secondary winding may be disposed so that there is exactly room on the rod for an integral number of periods of the function $n(x)$ obtained by substitution of equation (29) in equation (27). If, now, the signal to be filtered is returned from the end of the delay line to its input, a multiple passage is obtained which has the effect of a corresponding extension of the delay line. The number of passages which still have sufficient effect, depends on the damping of the delay line.

Figure 7 shows the circuit diagram of an experimental low-pass filter. The delay line 13 was made without the use of ferromagnetic materials and has approximately the following characteristic values:

$$C'=6\times10^{19}F/m,$$
$$L'=5.5\times10^{13}H/M.$$

This results in a velocity of propagation $v$ of about $1.75\times10^5$ i m/s, i.e. about 1/1700 part of the velocity of light. The response characteristic of the ideal low-pass filter having a cutoff angular frequency $\omega_o$ is:

$$h_0(t)=\frac{1}{\pi}\frac{\sin\ \omega_g t}{t}$$

From this it follows according to equation (27) that for the secondary winding 14, the number of turns per unit length must be $$n(x)\approx\frac{1}{\pi kc}Z_w\frac{\sin\omega_g\frac{x}{v}}{x}$$

$n(x)$ is an even function. Hence, the reflection principle can be used, i.e. the end of the delay line is substantially short circuited by the resistance $R_o<<Z_w$. The single length of the delay line 13 is 30 cm.; with a given cutoff frequency $f_0=3$ MHz., ten zero places of the function $n(x)$ can be accommodated. The integration is performed by the series combination of the elements $R_2$ and C; the resistors $R_o$ and $R_1$ together with the capacitor C compensate for the low-pass characteristic for low frequencies.

FIG. 8 shows the empirically ascertained damping in the transmission characteristic of the filter network described as a function of the frequency $f$. Special attention should be paid to the steep filter edge and the strictly linear phase characteristic as a function of the frequency (broken line in FIG. 8).

A further possible use is the construction of wide-band 90° phase-shifting devices. As is known, the differentiating effect of an inductive or capacitive tapping results in a linearly increasing frequency dependence:

$$H_1(\omega)\sim j\omega$$

If now by a suitable choice of the functions $f(x)$ or $n(x)$ the amplitude characteristic $$H_2(\omega)\sim\frac{1}{\omega}$$

is formed, the overall effective transfer characteristic $$H_T=H_1\cdot H_2\sim j\,\mathrm{sgn}\,\omega$$

is obtained.

This is the characteristic of an ideal 90° phase-shifting device. In practice, the transfer function $H_2(\omega)\sim1/|\omega|$ cannot be completely realized, since a pole appears at the point $\omega=0$. Hence one must be content with approximations, example with the function $$H_2(\omega)\sim\frac{1}{+\sqrt{\omega^2+\omega_o^2}}$$

In practice this means that only from a frequency $\omega>>\omega_o$ the ideal phase shift is obtained. FIG. 9 shows the experimentally obtained transfer characteristic of such a phase-shifting device. Special attention is to be paid to the extraordinarily wide frequency band, within which the phase and amplitude variations are very small.

What I claim is:

1. A delay line for obtaining a selected transfer characteristic of an applied signal comprising a longitudinal slow wave structure means for receiving said applied signal and having a characteristic impedance; a conductor for supplying an output signal disposed continuously proximate said slow-wave structure and having a longitudinally varying impedance with respect to said structure; whereby said transfer characteristic can be achieved by selecting said impedance variations.

2. A delay line as claimed in claim 1 wherein said conductor comprises a resistive coating contacting said structure and having a longitudinally variable resistance, and a conductive layer contacting said coating, to provide said output signal.

3. A delay line as claimed in claim 2 wherein said coating has a longitudinally variable thickness to provide said variable resistance.

4. A delay line as claimed in claim 2 wherein said coating has a longitudinally variable width to provide said variable resistance.

5. A delay line as claimed in claim 1 further comprising a dielectric layer disposed between said structure and said conductor; and wherein said longitudinally varying impedance comprises a longitudinally varying capacitance.

6. A delay line as claimed in claim 5 wherein said dielectric layer has a uniform thickness and said conductor has a longitudinally varying width.

7. A delay line as claimed in claim 1 wherein said conductor comprises a coil wound about said structure insulated therefrom and having longitudinally varying turns per unit length.

8. A delay line as claimed in claim 7 wherein a selected portion of said coil has a winding direction opposed to the remainder of the coil.

9. A delay line as claimed in claim 1 wherein said structure comprises a coil.

10. A delay line as claimed in claim 1 further comprising means for terminating said structure in said characteristic impedance.